United States Patent
Cortes Gomez

(10) Patent No.: US 10,432,528 B2
(45) Date of Patent: Oct. 1, 2019

(54) DISTRIBUTED TRAFFIC INSPECTION IN A TELECOMMUNICATIONS NETWORK

(71) Applicant: Telefonaktiebolaget L M Ericsson (publ), Stockholm (SE)

(72) Inventor: Francisco Cortes Gomez, The Hague (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 209 days.

(21) Appl. No.: 14/759,806

(22) PCT Filed: Jan. 8, 2013

(86) PCT No.: PCT/EP2013/050229
§ 371 (c)(1),
(2) Date: Jul. 8, 2015

(87) PCT Pub. No.: WO2014/108173
PCT Pub. Date: Jul. 17, 2014

(65) Prior Publication Data
US 2015/0341271 A1    Nov. 26, 2015

(51) Int. Cl.
*H04L 12/801* (2013.01)
*H04L 12/24* (2006.01)
*H04L 12/26* (2006.01)

(52) U.S. Cl.
CPC ........... *H04L 47/11* (2013.01); *H04L 41/042* (2013.01); *H04L 43/028* (2013.01); *H04L 43/026* (2013.01); *H04L 43/0817* (2013.01)

(58) Field of Classification Search
CPC .............................. H04L 43/028; H04L 47/11
See application file for complete search history.

(56) References Cited

U.S. PATENT DOCUMENTS

2007/0115962 A1    5/2007  Mammoliti et al.
2010/0088756 A1*   4/2010  Balakrishnan ...... H04L 63/0245
                                                        726/13
(Continued)

FOREIGN PATENT DOCUMENTS

EP    1949623 A4    3/2012
GB    2459612 B     4/2012
(Continued)

OTHER PUBLICATIONS

International Search Report, Application No. PCT/EP2013/050229, dated Sep. 2, 2013.
(Continued)

*Primary Examiner* — Derrick W Ferris
*Assistant Examiner* — Farhad Ali
(74) *Attorney, Agent, or Firm* — Sage Patent Group

(57) ABSTRACT

A first node receives data packets of a flow and forwards the data packets of the flow to a second node. The first node takes a first decision whether to perform inspection of a payload section of at least one data packet of the flow at the first node and indicate a result of the first decision to the second node. The second node receives the data packets of the flow from the first node. On the basis of the result of the first decision indicated by the first node, the second node takes a second decision whether to perform inspection of a payload section of at least one data packet of the flow at the second node.

24 Claims, 9 Drawing Sheets

(56) References Cited

U.S. PATENT DOCUMENTS

| | | | |
|---|---|---|---|
| 2010/0146100 A1 | 6/2010 | Gerber et al. | |
| 2011/0099631 A1* | 4/2011 | Willebeek-LeMair | ....................... H04L 43/028 726/23 |
| 2011/0286350 A1 | 11/2011 | Wimmer et al. | |
| 2012/0092995 A1 | 4/2012 | Arvidsson et al. | |
| 2013/0219168 A1* | 8/2013 | Gearhart | ............. H04L 63/0485 713/153 |
| 2014/0146665 A1* | 5/2014 | Strasman | .......... H04W 28/0289 370/230 |

FOREIGN PATENT DOCUMENTS

| | | |
|---|---|---|
| WO | WO 99/63727 A1 | 5/1999 |
| WO | WO 2010/031084 A1 | 3/2010 |

OTHER PUBLICATIONS

Written Opinion of the International Searching Authority, Application No. PCT/EP2013/050229, dated Sep. 2, 2013.

Dakshinamoorthy, Presentation—"Flow Metadata for Enhanced Application Awareness" *Cisco IOS Advantage Webinars*, Jun. 11, 2012, 64 pp.

Hayes et al., "DPICO: A High Speed Deep Impact Packet Inspection Engine Using Compact Finite Automata", *Proceedings of the 3rd ACM/IEEE Symposium on Architecture for Networking and Communications Systems (ANCS '07)*, Orlando, Florida, Dec. 3-4, 2007, pp. 195-203.

Hayes, C. et al., "DPICO: A High Speed Deep Packet Inspection Engine Using Compact Finite Automata", *ANCS* 2007, pp. 195-203.

Examination Report for Indian Patent Application No. 2503/KOLNP/2015 dated Nov. 30, 2018, 6 pages.

* cited by examiner

DISTRIBUTED TRAFFIC INSPECTION IN A TELECOMMUNICATIONS NETWORK

CROSS REFERENCE TO RELATED APPLICATION

This application is a 35 U.S.C. § 371 national stage application of PCT International Application No. PCT/EP2013/050229, filed on 8 Jan. 2013, the disclosure and content of which is incorporated by reference herein in its entirety. The above-referenced PCT International Application was published in the English language as International Publication No. WO 2014/108173 A1 on 17 Jul. 2014.

TECHNICAL FIELD

The present invention relates to methods for traffic inspection in a telecommunications network and to corresponding devices.

BACKGROUND

In telecommunications networks, inspection of a payload section of data packets may be used for enabling smarter network decisions, e.g., with respect to controlling data traffic. For example, the inspection may be used as a basis for providing differentiated treatment of traffic based on potentially complex characteristics of the data traffic itself. This differentiated treatment may involve acting on the data traffic itself, e.g., by discarding data packets, modifying data packets, throttling transmission rates, or the like. Further, the differentiated treatment may involve taking actions related to the data traffic, e.g., charging or replication of the data traffic for law enforcement purposes or monitoring. Such inspection of payload may be implemented as Deep Packet Inspection (DPI). DPI functionalities may for example be integrated in nodes conveying user plane traffic, e.g., in a gateway or transport node.

However, DPI may require significant amounts of processing resources. Accordingly, implementation of DPI in a node conveying user plane traffic may result in performance degradation of functionalities needed for conveying the user plane traffic. Such performance degradation may be up to several orders of magnitude.

In addition, the processing load caused by DPI may depend strongly not only on the complexity of implemented inspection algorithms, but also on the nature of inspected data traffic. For example, a high proportion of data traffic which is "easy to classify" may lead to relatively low processing load, while a high proportion of data traffic which is "hard to classify" may lead to a processing load which is significantly higher, e.g., up to several orders of magnitude, even if the absolute amount of conveyed data traffic remains unchanged. Although a statistical distribution of data traffic between "easy to classify" and "hard to classify" may be assumed as a general rule, this may alleviate high load variance within relatively short periods of time, but typically does not alleviate impacts from new traffic patterns or addition of complex services. For instance, the dissemination of a new virus/worm requiring complex detection rules, or the success of a new peer-to-peer product may significantly increase DPI load on a rather short time scale.

DPI may also be implemented in specialized nodes. Such nodes may be optimized for DPI and offer sufficiently high processing resources. However, as additional devices such specialized nodes typically require high-capacity network ports for transfer of the user plane data traffic. This applies to the specialized node itself, but also to other nodes connected to the specialized node. Such high-capacity network ports may contribute significantly to the overall cost of a node. Further, such specialized nodes are typically designed to offer processing resources which are sufficient to perform also very complex inspection and classification algorithms at high speed, which may result in significant costs for a given throughput of user plane data. In scenarios where the user plane data traffic has a high proportion of "easy to classify" data the expensive hardware of the specialized node would be utilized inefficiently. Moreover, such a specialized node may constitute an additional potential point of failure and add complexity to any high-availability transport network design.

Accordingly, there is a need for techniques which allow for efficiently inspecting traffic in a telecommunications network.

SUMMARY

According to an embodiment of the invention, a method of inspecting data traffic in a telecommunications network is provided. According to the method, a node of the telecommunications network receives data packets of a flow. The node also forwards the received data packets of the flow to a downstream node of the telecommunications network. Further, the node takes a decision whether to perform inspection of a payload section of at least one data packet of the flow at the node. The node indicates a result of this decision to the downstream node.

According to a further embodiment of the invention, a method of inspecting data traffic in a telecommunications network is provided. According to the method, a node of the telecommunications network receives data packets of a flow from an upstream node of the telecommunications network. Further, the node receives an indication of a result of a decision by the upstream node whether to perform inspection of a payload section of at least one data packet of the flow at the upstream node. On the basis of the indicated result of said decision by the upstream node, the node takes a decision whether to perform inspection of a payload section of at least one data packet of the flow at the node.

According to a further embodiment of the invention, a node for a telecommunications network is provided. The node comprises at least one first interface for receiving data packets of a flow, at least one second interface for forwarding the received data packets to a downstream node of the telecommunications network, and a processor. The processor is configured to take a decision whether to perform inspection of a payload section of at least one data packet of the flow at the node and to indicate, e.g., via the second interface, a result of the decision to the downstream node.

According to a further embodiment of the invention, a node for a telecommunications network is provided. The node comprises at least one interface for receiving data packets of a flow from an upstream node of the telecommunications network and a processor configured to receive, e.g., via the interface, an indication of a result of a decision by the upstream node whether to perform inspection of a payload section of at least one data packet of the flow at the upstream node of the telecommunications network. Further, the processor is configured to take, on the basis of the indicated result of said decision by the upstream node, a decision whether to perform inspection of a payload section of at least one data packet of the flow at the node.

According to a further embodiment of the invention, a system for inspecting data traffic in a telecommunications network is provided. The system comprises a first node and a second node. The first node is configured to receive data packets of a flow, forward the data packets of the flow to the second node, take a first decision whether to perform inspection of a payload section of at least one data packet of the flow at the first node, and indicate a result of the first decision to the second node. The second node is configured to receive the data packets of the flow from the first node and, on the basis of the result of the first decision indicated by the first node, take a second decision whether to perform inspection of a payload section of at least one data packet of the flow at the second node.

According to a further embodiment of the invention, a computer program product is provided, e.g., in the form of a computer readable storage medium, the computer program product comprises computer readable program code that, when executed by a processor of a node of a mobile telecommunications network, causes the node to operate in accordance with any of the above methods.

DETAILED DESCRIPTION OF EMBODIMENTS

In the following, concepts in accordance with exemplary embodiments of the invention will be explained in more detail and with reference to the accompanying drawings. The illustrated embodiments relate to concepts for traffic inspection in a telecommunications network, e.g., a mobile telecommunications network as specified by the 3GPP ($3^{rd}$ Generation Partnership Project), e.g., using GSM (Global System for Mobile Communications) and General Packet Radio Service (GPRS), UMTS (Universal Mobile Telecommunications System), optionally in connection with High Speed Packet Access (HSPA), or LTE (Long Term Evolution) access technology, in a fixed telecommunications network, e.g., using DSL (Digital Subscriber Line) or coaxial cable access technology. However, the concepts may also be applied in other types of telecommunications networks and to various other types of access technology.

In the illustrated examples, functionalities for traffic inspection may be implemented in nodes of the telecommunications network, e.g., in a transport node, gateway, or access node, thereby integrating these functionalities in a node which is also responsible for handling user plane data traffic. A corresponding scenario will now be further explained by referring to an exemplary implementation of the telecommunications network as illustrated in FIG. 1.

Figure 1:
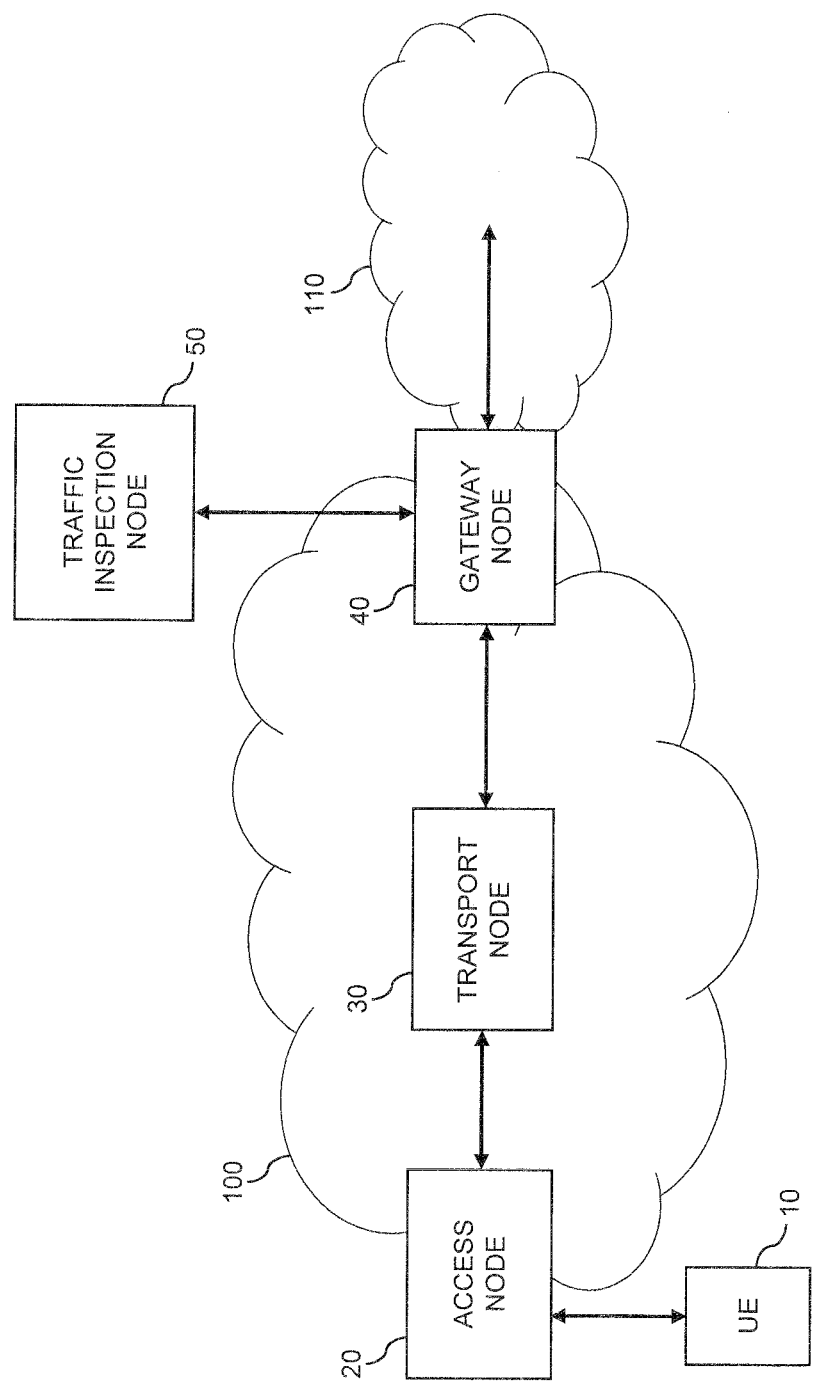
FIG. 1 schematically illustrates nodes of a telecommunications network in which concepts according to an embodiment of the invention may be applied.

FIG. 1 schematically illustrates nodes of the telecommunications network 100, which includes an access node 20, a transport node 30, and a gateway node 40. Depending on the implemented access technology, the access node 20 may for example be DSL or cable modem, the transport node 30 may be a Broadband Remote Access Server (BRAS) or Broadband Network Gateway (BNG), and the gateway node 40 may be a data center gateway or internet border gateway. In other examples, the access node 20 may be a base station controller, e.g., a Radio Network Controller (RNC), or a base station, e.g., a Node B or Evolved Node B, the gateway node 40 may for example be a Gateway GPRS Support Node (GGSN) or a Packet Data Network Gateway (PGW), and the transport node 30 may correspond to any type of node as typically used for conveying user plane data traffic between such nodes, e.g., a Iub transport node.

Each of these nodes may offer functionalities for traffic inspection. As will be further explained below, these traffic inspection functionalities may be utilized in a distributed manner, thereby leveraging the load on each individual nodes 20, 30, 40. Each of the nodes 20, 30, 40 may contribute to the overall inspection result, thereby efficiently utilizing available processing resources at the different nodes 20, 30, 40. In addition, also a dedicated traffic inspection node 50 may be provided, which in the illustrated example is coupled to the gateway node 40. If for a given data packet or group of data packets sufficient inspection by the nodes 20, 30, and 40 is not possible, the data packet or group of data packets may be forwarded to the dedicated traffic inspection node 50.

A user equipment (UE) 10 may connect to the access node 20. Via the access node 20, the transport node 30, and the gateway node 40, the UE 10 may receive downlink user plane data traffic from an external network 110, e.g., the Internet, or send uplink user plane data traffic to the external network 110. Similarly, the UE 10 may send uplink user plane traffic via the access node 20, the transport node 30, and the gateway node 40. The access node 20, the transport node 30, and the gateway node 40 are arranged in a chain configuration, in which one node may receive the user plane data traffic from an upstream node and/or may send the user plane traffic to a downstream node. In the downlink direction the access node 20 is a downstream node of the transport node 30 and of the gateway node 40, and the transport node 30 is a downstream node of the gateway node 40. Further, in the downlink direction the gateway node 40 is an upstream node of the transport node 30 and of the access node 20, and the transport node 30 is an upstream node of the access node 20. In the uplink direction the access node 20 is an upstream node of the transport node 30 and of the gateway node 40, and the transport node 30 is an upstream node of the gateway node 40. Further, in the uplink direction the gateway node 40 is a downstream node of the transport node 30 and of the access node 20, and the transport node 30 is a downstream node of the access node 20.

The user plane data traffic is assumed to be packet based. For example, the user plane data traffic may be based on the Internet Protocol (IP). Further, the user plane data traffic may be based on a certain transport protocol, e.g., the Transport Control Protocol (TCP) or User Datagram Protocol (UDP). Such protocols rely on a defined structure of the data packets, typically including a header section and a payload section. The header section typically includes information for conveying the data packet through the network, e.g., in the form of a destination address and source address.

The header may include a so-called IP 5-tuple formed by the IP destination address, IP source address, transport protocol destination port number, transport protocol source port number, and a protocol type identifier. The payload section may in turn include user data. In some cases, the payload section may also include encapsulated protocol information of other protocols, the Hypertext Transfer Protocol (HTTP), File Transfer Protocol (FTP), Realtime Transport Protocol (RTP), or the like. The traffic inspection functionalities of the nodes 20, 30, 40, and 50 are based on inspecting the payload section of the data packets. This is typically accomplished in addition to inspecting the header section of the data packets.

The traffic inspection functionalities of the nodes 20, 30, 40, and 50 utilize the concepts of flows. A flow may be regarded as a sequence of data packets having common characteristics. For example, the data packets of the flow may each have the same destination, and typically also the same source. The sequence of data packets may also be further characterized by additional characteristics, so that different flows may be identified between the same source and destination. Examples of such further characterization are the usage of TCP or UDP port numbers or IP protocol type as defined in the IP 5-tuple. Accordingly, data packets belonging to a particular flow may be identified by the IP 5-tuple or parts thereof. That is to say, data packets with matching elements of the IP 5-tuple may be identified as belonging to the same flow. Alternatively or in addition, other types of flow identifiers may be utilized, e.g., a flow label as defined in the IPv6 (Internet Protocol Version 6) header. Irrespective of the utilized flow identifier(s), identifying that a data packet belongs to a particular flow may be achieved without inspecting the payload section of the data packet. For example, flow membership can be derived from the header section of the data packet. For this purpose, exact or wildcarded matches on elements of the IP 5-tuple or the IPv6 flow label may be evaluated. More complex considerations may be applied as well. For example, specific sets of IP addresses may be considered as equivalent for the purposes evaluating the flow membership. It should be noted that identifying that a data packet belongs to a particular flow does not necessarily require that the source and/or destination of the data packet is identified.

Both source and destination of a flow may generally be different from a specific physical endpoint. For example, the destination may be a multicast group, an anycast group, or a broadcast domain. Further, the source could be a computing resource on a multi-homed device using two different transport interfaces and a protocol like the Stream Control Transmission Protocol (SCTP) or Multipath TCP, thereby being able to use different source IP addresses for one and the same flow. The source could also be a device using random source IP addresses in the data packets, e.g., for privacy purposes, or a set of devices sharing the load of serving one specific service request.

Further, the concepts as described herein assume that data packets of a particular flow, or of multiple flows, are conveyed through a common group of two or more nodes. In the exemplary scenario, these nodes are formed by the access node 20, the transport node 30, and the gateway node 40. Such a common group of nodes may is typically present if all data packets of the flow have the same destination, or have destinations in a common subnetwork. Irrespective of the destination identified in the data packets, such common group of nodes may also be present in an access network where typically all data packets transmitted to or from a given end device connected the access network, regardless of the flow, are conveyed by the nodes arranged between a point of attachment of the source to the access network and a concentration point providing connectivity to the rest of the network. The latter situation for example applies in FIG. 1, where the access node 20 forms the point of attachment of the UE 10 to the telecommunications network 100, and the gateway 40 forms a concentration point for connection to the external network 110.

According to the concepts as further explained in the following, efficient distribution of load required for the packet inspection functionalities is achieved by providing each of the nodes 20, 30, 40 conveying the user plane data traffic with a functionality for taking a decision whether to inspect the payload section of a data packet of a certain flow, and to communicate the result of such decision with one or more other nodes, e.g., to receive the result of a corresponding decision taken by another node and/or to indicate the result of the decision to another node. The detailed implementation of these functionalities may depend on a role which the node takes in conveying the user plane data traffic. Such roles will now be further explained with reference to FIG. 2.

Figure 2:
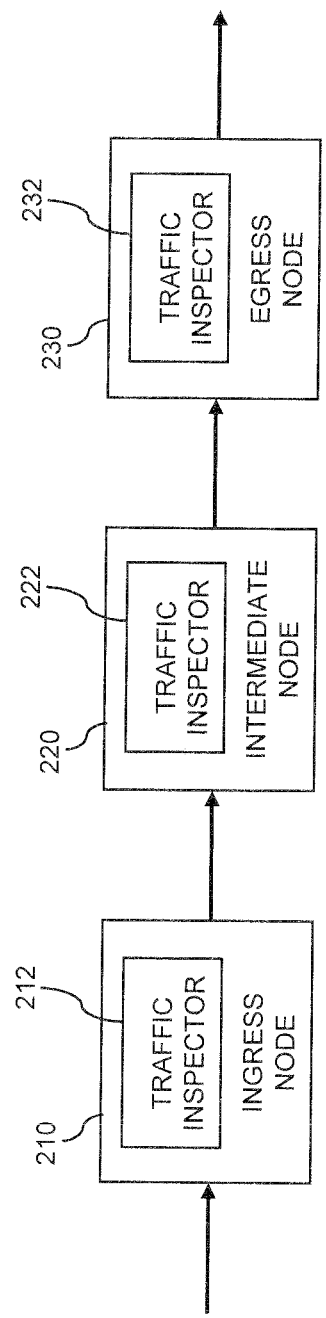
FIG. 2 schematically illustrates a system of nodes for performing traffic inspection in accordance with an embodiment of the invention.

FIG. 2 illustrates a system for distributed inspection of data traffic, which is implemented by three nodes 210, 220, 230 conveying user plane data traffic in a given direction, e.g., uplink or downlink as explained above. The nodes 210, 220, 230 are arranged in a chain configuration. The node 210 is the first node in the chain and therefore referred to as ingress node. The ingress node 210 receives the user plane data traffic from its respective destination and forwards the user plane data traffic to the node 220, which in turn forwards the user plane data traffic to the node 230. The node 230, which is the last node of the chain, forwards the user plane data traffic towards its destination. Due to their arrangement in the chain, the nodes 220 and 230 are referred to as intermediate node and egress node, respectively. For allowing reception and/or forwarding of the user plane data traffic, the nodes 210, 220, 230 are equipped with correspondingly configured interfaces. It should be noted that the illustrated chain arrangement may be extended by introducing additional intermediate nodes having similar functionalities as the intermediate node 220. Further, the intermediate node 220 could be omitted, thereby obtaining a chain arrangement formed only of the ingress node 210 and the egress node 230. Also, the presence of further nodes outside the illustrated chain arrangement is not excluded. However, it is assumed that such nodes do not participate in the illustrated distribution of inspection load.

In the chain arrangement as illustrated in FIG. 2, one node may receive user plane data traffic from an upstream node and/or forward the user plane data traffic to a downstream node. In particular, the ingress node 210 forwards user plane data traffic to the intermediate node 220, and indirectly to the egress node 230. The intermediate node 220 forwards user plane data traffic to the egress node 230. Further, the egress node 230 receives user plane data traffic from the intermediate node 220, and indirectly from the ingress node 210. The intermediate node receives user plane data traffic from the ingress node 210. The ingress node 210 is an upstream node of the intermediate node 220 and of the egress node 230. The intermediate node 220 is an upstream node of the egress node 230. The egress node is a downstream node of the intermediate node 220 and of the ingress node 210. The intermediate node is a downstream node of the ingress node 210. Accordingly, with reference to the uplink direction as explained in connection with FIG. 1, the access node 20 may be identified with the ingress node 210, the transport node 30 may be identified with the intermediate node 220, and the gateway node 40 may be identified with the egress node 230. With reference to the downlink direction as explained in connection with FIG. 1, the gateway node 40 may be identified with the ingress node 210, the transport node 30 may be identified with the intermediate node 220, and the access node 20 may be identified with the egress node 230.

As further illustrated, each of the nodes 210, 220, 230 is provided with a traffic inspector. More specifically, the ingress node 210 is provided with traffic inspector 212, the intermediate node 220 is provided with traffic inspector 222, and the egress node is provided with traffic inspector 232. The traffic inspectors 212, 222, 232 may for example be implemented by a processor of the corresponding node. Functionalities of the traffic inspectors 212, 222, 232 include identification of one or more flows in the user plane data traffic conveyed by the nodes 210, 220, 230, taking a decision whether to perform inspection of a payload section of one or more data packets of an identified flow, in the following also referred to as payload inspection of the flow, and communication of results of such decisions with other nodes. In particular, if the packet inspector 212 at the ingress node 210 identifies a first flow and decides to perform payload inspection of the first flow, it may indicate the result of this decision to the intermediate node 220 and also to the egress node 230. The packet inspector 222 at the intermediate node 220 and the packet inspector 232 at the egress node 230 may infer from this indication that payload inspection of the first flow is already performed at the ingress node 210 and therefore decide not to perform payload inspection of the first flow, thereby saving processing resources. Concerning a second flow, the packet inspector 212 at the ingress node 210 may decide not to perform payload inspection, e.g., due to insufficient capacity, and indicate the result of this decision to the intermediate node 220 and to the egress node 230. The packet inspector 222 at the intermediate node 220 may infer from this indication that payload inspection of the second flow is not yet performed and therefore decide to perform payload inspection of the second flow, and indicate the result of this decision to the egress node 230. The packet inspector 232 at the egress node 230 may infer from this indication that payload inspection of the first flow is already performed at the intermediate node 220 and therefore decide not to perform payload inspection of the second flow, thereby saving processing resources. Concerning a third flow, the packet inspector 212 at the ingress node 210 may decide not to perform payload inspection, e.g., due to insufficient capacity, and indicate the result of this decision to the intermediate node 220 and to the egress node 230. Also the packet inspector 222 at the intermediate node 220 may decide not to perform payload inspection of the third flow, e.g., due to insufficient capacity, and indicate the result of this decision to the egress node 230. The packet inspector 232 at the egress node 230 may infer from this indication that payload inspection of the third flow is not yet performed and therefore decide to perform payload inspection of the third flow. As can be seen from the above exemplary situation involving three flows, the load for performing payload inspection can be efficiently distributed among the nodes 210, 220, 230, thereby achieving payload inspection for all three flows.

In addition to the decision result, the nodes 210, 220, 230 may also communicate results of the payload inspection itself, e.g., a partial or full classification of the flow. For example, the ingress node 210 may identify a flow, decide to perform payload inspection of the flow, and indicate the result of this payload inspection to the intermediate node 220 and to the egress node 230. The intermediate node 220 or the egress node 230 may then utilize this result. For example, if the result is a partial classification, the packet inspector 222 at the intermediate node 220 or the packet inspector 232 at the egress node 230 may decide to perform payload inspection of the flow, taking into account this partial classification, so as to further or fully classify the flow. The result of the decision to perform payload inspection of a flow may be indicated independently from the result of the payload inspection itself, thereby allowing to inform the other node(s) already before a result of the payload inspection is available and avoiding that payload inspection is started at multiple nodes. Also, the decision whether to perform payload inspection of a flow at one node may not only depend on the decision result indicated by the other node(s), but also on the result of payload inspection indicated by the other node(s).

The payload inspection may be implemented as DPI. However, other forms of payload inspection could be used as well.

The result of the decision and/or the result of payload inspection may for example be indicated in a data packet related to the flow, e.g., a marker data packet as further explained below. In this way, the existing user plane data interface between two nodes of the chain may be efficiently utilized also for communicating the decision result and/or result of payload inspection.

The capabilities for performing payload inspection may differ between the different nodes 210, 220, 230 of the chain. For example, the ingress node 210 and/or the intermediate node 220 may have capabilities to perform payload inspection for allowing identification of only a subset of classes from a total set of flow classes, whereas the egress node 230 may have capabilities to perform payload inspection for allowing identification all classes from the total set of flow classes. In some scenarios "OpenFlow" mechanisms such as an OpenFlow switch, could be used to mark such subset of the flows already before reaching the downstream node with more advanced payload inspection capabilities. For example, such marking could be accomplished at the ingress node 210, and the advanced payload inspection capabilities needed for some flow classes could be implemented in the intermediate node 220 or in the egress node 230.

A method of inspecting data traffic in accordance with an exemplary implementation of the above concepts in the ingress node 210 will now be explained in connection with FIG. 3. In this implementation, the payload inspection is assumed to be implemented as DPI. However, other types of payload inspection could be utilized as well.

At step 305, the ingress node 210 receives a data packet. For example, if the ingress node 210 corresponds to the access node 20 of FIG. 1, the data packet could be received from the UE 10. If the ingress node 210 corresponds to the gateway node 40 of FIG. 1, the data packet could be received from a source connected via the external network 110.

At step 310, the ingress node 210 performs a lookup in a flow information base (FIB) 312 maintained at the ingress node 210 and, at step 320, performs a check whether the data packet belongs to a known, already classified flow, with stored classification information in the FIB 312. If this is the case, as indicated by branch "Y", the method continues with step 330. At step 330, the data packet may be forwarded to a downstream node such as the intermediate node 220 or the egress node 230, without any further processing at the ingress node 210.

If the check of step 320 reveals that the data packet belongs to a not yet classified unknown flow, the method continues with step 340, as indicated by branch "N". At step 340, the ingress node 210 determines the load associated with performing DPI on the data packet. At step 345, the ingress node 210 checks whether the load associated with performing DPI on the data packet is too high, i.e., exceeds the present capacity of the ingress node 210. The check of step 345 may for example involve comparison of the load to a threshold value.

If the check of step 345 reveals that the load is not too high, as indicated by branch "N", the method continues with step 350. At step 350, the ingress node 210 performs DPI on the data packet, e.g., using DPI lookup tables 352 cached or otherwise stored at the ingress node 210. The DPI of step 350 may be performed in a constrained manner, e.g., by defining a maximum time span until finishing the DPI process, irrespective of achieving full classification of the data packet. In this way, it can be ensured that transport of the data packet is not unduly delayed.

At step 360, the ingress node 210 checks whether the DPI process of step 350 resulted in full classification of the data packet. If this is the case, as indicated by branch "Y", the method continues with step 370.

At step 370, the ingress node 210 sends a marker data packet to a downstream node such as the intermediate node 220 or the egress node 230. The marker data packet indicates that the ingress node 210 decided to perform DPI on a data packet of the flow and in this case also indicates the classification result from the DPI process, e.g., in the form of a tag.

At step 380, the ingress node 210 stores the classification result in the FIB 312. Then, at step 390, the ingress node 210 may forward the classified data packet to a downstream node such as the intermediate node 220 or the egress node 230.

If the check of step 360 reveals that the DPI process of step 350 did not achieve full classification of the data packet, the method continues with step 380, without sending the marker data packet at step 370, as indicated by branch "N". Also in this case, the flow is stored in the FIB 322, however without classification result. Then, at step 390, the ingress node 210 may forward the unclassified data packet to a downstream node such as the intermediate node 210 or the egress node 230.

If the check of step 345 reveals that the load associated with performing DPI on the data packet is too high, the method continues with step 380, as indicated by branch "Y". In this case, the flow is stored in the FIB 312, however without classification result. That is to say, the ingress node 210 in this case decides not to perform DPI on the data packet and forwards the data packet at step 390 to a downstream node such as the intermediate node 220 or the egress node 230, without performing any DPI processing.

From the presence or absence of the marker data packet sent at step 370, downstream nodes such as the intermediate node 220 and the egress node 230 may learn about the decision of the ingress node 210 at step 345 and also about any results from DPI on a packet of the flow as performed at step 350.

A method of inspecting data traffic in accordance with an exemplary implementation of the above concepts in the intermediate node 220 will now be explained in connection with FIG. 4.

Also in this implementation, the payload inspection is assumed to be implemented as DPI. However, other types of payload inspection could be utilized as well.

At step 405, the intermediate node 220 receives a data packet from an upstream node. For example, the data packet may be received from the ingress node 210 or from another intermediate node.

At step 410, the intermediate node 220 checks whether the data packet corresponds to a marker data packet. If this is the case, as indicated by branch "Y", the method continues with step 420.

At step 420, the intermediate node 220 stores the flow associated with the marker data packet in an FIB 422 maintained at the intermediate node 220. This may in particular involve storing a result of packet classification from a DPI process performed at an upstream node.

Then, at step 430, the intermediate node 220 may forward the data packet to a downstream node such as the egress node 230 or a further intermediate node, without any further processing at the intermediate node 220.

If the check of step 415 reveals that the data packet does not correspond to a marker data packet, the method continues with step 440, as indicated by branch "N".

At step 440, the intermediate node 220 performs a lookup in the FIB 422 maintained at the intermediate node 220 and, at step 445, performs a check whether the data packet belongs to a known, already classified flow, with stored classification information in the FIB 422. If this is the case, as indicated by branch "Y", the method continues with step 430. At step 430, the data packet may be then forwarded to a downstream node such as the egress node 230 or a further intermediate node, without any further processing at the intermediate node 220.

If the check of step 440 reveals that the data packet belongs to a not yet classified unknown flow, the method continues with step 450, as indicated by branch "N". At step 450, the intermediate node 220 determines the load associated with performing DPI on the data packet. At step 455, the intermediate node 220 checks whether the load associated with performing DPI on the data packet is too high, i.e., exceeds the present capacity of the intermediate node 220. The check of step 455 may for example involve comparison of the load to a threshold value.

If the check of step 455 reveals that the load is not too high, as indicated by branch "N", the method continues with step 460. At step 460, the intermediate node 220 performs DPI on the data packet, e.g., using DPI lookup tables 462 cached or otherwise stored at the intermediate node 220. The DPI of step 460 may be performed in a constrained manner, e.g., by defining a maximum time span until finishing the DPI process, irrespective of achieving full classification of the data packet. In this way, it can be ensured that transport of the data packet is not unduly delayed.

At step 470, the intermediate node 220 checks whether the DPI process of step 460 resulted in full classification of the data packet. If this is the case, as indicated by branch "Y", the method continues with step 480.

At step 480, the intermediate node 220 sends a marker data packet to a downstream node such as the egress node 230 or a further intermediate node. The marker data packet indicates that the intermediate node 220 decided to perform DPI on a data packet of the flow and in this case also indicates the classification result from the DPI process, e.g., in the form of a tag.

At step 490, the intermediate node 220 stores the classification result in the FIB 422. Then, at step 495, the intermediate node 220 may forward the classified data packet to a downstream node such as the egress node 230 or a further intermediate node.

If the check of step 470 reveals that the DPI process of step 460 did not achieve full classification of the data packet, the method continues with step 490, without sending the marker data packet at step 480, as indicated by branch "N". Also in this case, the flow is stored in the FIB 422, however without classification result. Then, at step 495, the intermediate node 220 may forward the unclassified data packet to a downstream node such as the egress node 230 or a further intermediate node.

If the check of step 455 reveals that the load associated with performing DPI on the data packet is too high, the method continues with step 490, as indicated by branch "Y". In this case, the flow is stored in the FIB 422, however without classification result. That is to say, the intermediate node 220 in this case decides not to perform DPI on the data packet and forwards the data packet at step 495 to a downstream node such as the egress node 230 or a further intermediate node, without performing any DPI processing.

From the presence or absence of the marker sent at step 480, downstream nodes such as the egress node 230 or a further intermediate node may learn about the decision of the intermediate node 220 at step 455 and also about any results from DPI on a packet of the flow as performed at step 460.

Figure 5:
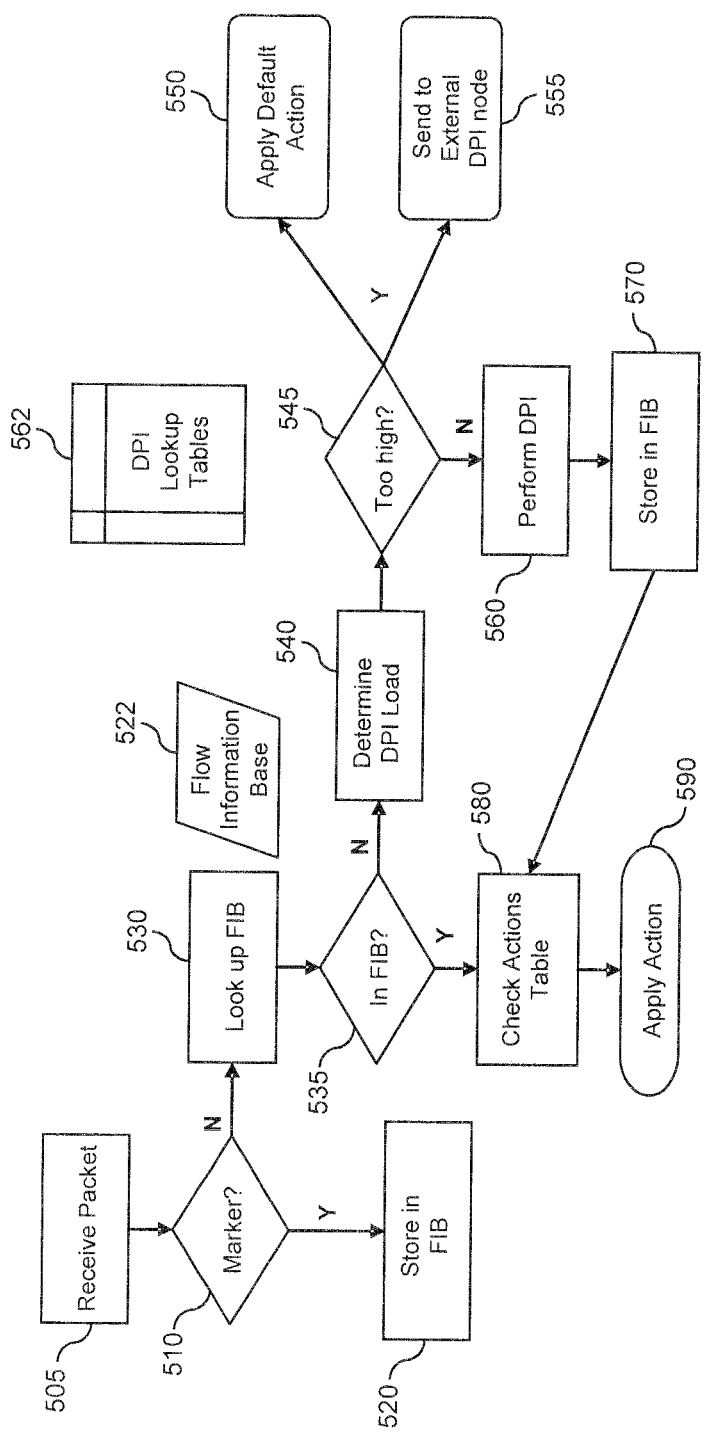
FIG. 5 shows a flowchart for illustrating a further method according to an embodiment of the invention.

A method of inspecting data traffic in accordance with an exemplary implementation of the above concepts in the egress node 230 will now be explained in connection with FIG. 5. Also in this implementation, the payload inspection is assumed to be implemented as DPI. However, other types of payload inspection could be utilized as well.

At step 505, the egress node 230 receives a data packet from an upstream node. For example, the data packet may be received from the ingress node 210, from the intermediate node 220, or from another intermediate node.

At step 510, the egress node 230 checks whether the data packet corresponds to a marker data packet. If this is the case, as indicated by branch "Y", the method continues with step 520.

At step 520, the egress node 230 stores the flow associated with the marker data packet in an FIB 522 maintained at the egress node 230. This may in particular involve storing a result of packet classification from a DPI process performed at an upstream node.

If the check of step 520 reveals that the data packet does not correspond to a marker data packet, the method continues with step 530, as indicated by branch "N".

At step 530, the egress node 230 performs a lookup in the FIB 522 maintained at the egress node 230 and, at step 535, performs a check whether the data packet belongs to a known, already classified flow, with stored classification information in the FIB 522.

If the check of step 530 reveals that the data packet belongs to a not yet classified unknown flow, the method continues with step 540, as indicated by branch "N". At step 540, the egress node 230 determines the load associated with performing DPI on the data packet. At step 545, the egress node 230 checks whether the load associated with performing DPI on the data packet is too high, i.e., exceeds the present capacity of the egress node 230. The check of step 545 may for example involve comparison of the load to a threshold value.

If the check of step 545 reveals that the load is not too high, as indicated by branch "N", the method continues with step 560. At step 560, the egress node 230 performs DPI on the data packet, e.g., using DPI lookup tables 562 cached or otherwise stored at the egress node 220. The DPI of step 560 may be performed in a constrained manner, e.g., by defining a maximum time span until finishing the DPI process, irrespective of achieving full classification of the data packet. In this way, it can be ensured that an action performed by the egress node 230 on the data packet is not unduly delayed.

At step 570, the egress node 230 stores the classification result in the FIB 522. Then, at step 580, the egress node 230 may check an actions table so as to identify the appropriate action to be performed on the classified data packet. At step 590, the egress node then applies this action. The action may for example involve generation of a charging record for the data packet and/or subsequent data packets of the flow, throttling transmission of the data packet and/or subsequent data packets of the flow, redirection of the data packet and/or subsequent data packets of the flow, or discarding of the data packet or subsequent data packets of the flow.

If the check of step 545 reveals that the load associated with performing DPI on the data packet is too high, the method continues with step 550 or step 555, as indicated by branches "Y". At step 550, a default action may be applied to the data packet and/or subsequent data packets of the flow, e.g., discarding or transmission with default parameters. At step 555, the packet may be transmitted to an external payload inspection node, such as the traffic inspection node 50 of FIG. 1.

If the check of step 530 reveals that the data packet belongs to an already classified known flow, the method continues with step 580, as indicated by branch "Y". At step 580, the egress node 230 may check the actions table so as to identify the appropriate action to be performed on the classified data packet. At step 590, the egress node then applies this action. As mentioned above, the action may involve generation of a charging record for the data packet and/or subsequent data packets of the flow, throttling transmission of the data packet and/or subsequent data packets of the flow, redirection of the data packet and/or subsequent data packets of the flow, or discarding of the data packet or subsequent data packets of the flow.

As can be seen, irrespective of the role of a node as the ingress node 210, intermediate node 220 or egress node 230, the node receive a data packet as input and checks whether this data packet belongs to an already classified known flow or not. If the data packet belongs to a known flow, the ingress node 210 and intermediate node 220 may just forward the data packet without any further processing. The egress node 230 in turn identifies an appropriate action to be applied to the classified packet and applies this action.

Also, irrespective of the role of a node, if the data packet does not belong to a known classified flow, the node tries to apply DPI, provided the present capacity of the node is sufficient. If the ingress node 210 or intermediate node 220 succeeds in classifying the flow, it sends the marker data packet in order to inform downstream nodes of its inspection decision and the classification result of the flow. The egress node 230 may just store the classification result and use it for applying an appropriate action on the data packet and/or subsequent data packets of the flow.

Received marker data packets allow the receiving node to learn about inspection decisions in upstream nodes and about results of payload inspection performed at upstream nodes. If an upstream node already decided to perform payload inspection of a flow, the node learning this decision from the marker data packet may decide to refrain from performing payload inspection of this flow. Similarly, the node may learn about results of the payload inspection and utilize such results, e.g., for applying an appropriate action or for performing further classification.

It is to be understood that the above-mentioned roles of nodes may also be implemented in a single node. For example, in some scenarios a certain node may act as an ingress node for data traffic in one direction and as an egress node for data traffic in the other direction. For example, this is the case for the access node 20 of FIG. 1, which may be an ingress node for data traffic in the uplink direction and an egress node for data traffic in the downlink direction. Further, this also applies to the gateway node 40 of FIG. 1, which may be an ingress node for data traffic in the downlink direction and an egress node for data traffic in the uplink direction. Also, for one flow a certain node may be an intermediate node, while for another flow it is an ingress or egress node. For example, such situations may occur if the chains of nodes conveying the different flows overlap only partially, i.e., due to different routing of the flows.

Accordingly, in some scenarios the role of the ingress node 210, intermediate node 220 or egress node 230 may be statically assigned to a node for data traffic of a given direction, e.g., as received via a certain interface of the node. In other scenarios, the role of the ingress node 210, the intermediate node 220 or the egress node 230 may be dynamically assigned to a node. For example, the node itself may determine its role for a given flow. A method of inspecting data traffic in accordance with an exemplary implementation of dynamically assigning a role to a node will now be explained in connection with FIG. 6.

At step 605, the node receives a data packet. For example, if the node acts as the intermediate node 220, the data packet may be received from an upstream node the ingress node 210 or from another intermediate node. If the node acts as the ingress node 210, the data packet may also be received from some other entity, e.g., the UE 10 or a source connected via the external network 110.

At step 610, the node checks whether the data packet corresponds to a marker data packet. If this is the case, as indicated by branch "Y", the method continues with step 620.

At step 620, the node stores the flow associated with the marker data packet in an FIB 622 maintained at the node. This may in particular involve storing a result of packet classification from a DPI process performed at an upstream node.

At step 630, the node performs a check whether it acts as the egress node 230 for the flow of this data packet. For this purpose, the node may for example look up a next hop node to which the data packet would be forwarded according to the usual transport handling performed by the node. Depending on the next hop node, the node may decide whether it acts as the egress node 230 for this flow or not. For example, a list of next hop node could be configured in the node, and the node may determine whether it acts as the egress node 230 by finding a match in the list. Further, the node may also perform such judgement by comparing a next hop transport address with an identifier common for all nodes participating in the distributed payload inspection. For example, such common identifier could be formed by an address prefix.

If the check of step 630 reveals that the node does not act as the egress node 230, the method continues with step 635, as indicated by branch "N". At step 635, the node may forward the data packet to a downstream node such as the intermediate node 220, a further intermediate node, or the egress node 230, without any further processing at the node.

If the check of step 620 reveals that the data packet does not correspond to a marker data packet, the method continues with step 640, as indicated by branch "N".

At step 640, the node performs a lookup in the FIB 622 maintained at the node and, at step 645, performs a check whether the data packet belongs to a known, already classified flow, with stored classification information in the FIB 622.

If the check of step 640 reveals that the data packet belongs to a not yet classified unknown flow, the method continues with step 650, as indicated by branch "N". At step 650, the node determines the load associated with performing DPI on the data packet. At step 655, the node checks whether the load associated with performing DPI on the data packet is too high, i.e., exceeds the present capacity of the node. The check of step 655 may for example involve comparison of the load to a threshold value.

If the check of step 655 reveals that the load is not too high, as indicated by branch "N", the method continues with step 660. At step 660, the node performs DPI on the data packet, e.g., using DPI lookup tables 662 cached or otherwise stored at the node. The DPI of step 660 may be performed in a constrained manner, e.g., by defining a maximum time span until finishing the DPI process, irrespective of achieving full classification of the data packet. In this way, it can be ensured that transport of the data packet or some other action is not unduly delayed.

At step 665, the intermediate node 220 checks whether the DPI process of step 660 resulted in full classification of the data packet. If this is the case, as indicated by branch "Y", the method continues with step 670.

At step 670, the node sends a marker data packet to a downstream node such as the intermediate node 220, a further intermediate node, or the egress node 230. The marker data packet indicates that the node decided to perform DPI on a data packet of the flow and in this case also indicates the classification result from the DPI process, e.g., in the form of a tag. It should be noted that in some scenarios the node may also omit sending of the marker data packet in response to determining that it acts as the egress node 230 for the flow of the data packet.

At step 675, the node stores the classification result in the FIB 622. Then, at step 680, the node may check an actions table so as to identify the appropriate action to be performed on the classified data packet. At step 685, the node applies this action. The action may involve generation of a charging record for the data packet and/or subsequent data packets of the flow, throttling transmission of the data packet and/or subsequent data packets of the flow, redirection of the data packet and/or subsequent data packets of the flow, or discarding of the data packet or subsequent data packets of the flow. Further, the action may also involve forwarding the data packet.

If the check of step 665 reveals that the DPI process of step 660 did not achieve full classification of the data packet, the method continues with step 690, without sending the marker data packet at step 670, as indicated by branch "N".

At step 690, the node performs a check whether it acts as the egress node 230 for the flow of the unclassified data packet. This check may be performed as explained in connection with step 630.

If the check of step 690 reveals that the node does not act as the egress node 230, the method continues with step 695, as indicated by branch "N". At step 695, the node may forward the data packet to a downstream node such as the intermediate node 220, a further intermediate node, or the egress node 230, without any further processing at the node.

If the check of step 690 reveals that the node acts as the egress node 230, the method continues with step 692 or 694, as indicated by branches "Y". At step 692, a default action may be applied to the data packet and/or subsequent data packets of the flow, e.g., discarding or transmission with default parameters. At step 694, the packet may be transmitted to an external payload inspection node, such as the traffic inspection node 50 of FIG. 1.

If the check of step 655 reveals that the load associated with performing DPI on the data packet is too high, the method directly continues with step 690, as indicated by branch "Y", without attempting to perform DPI on the data packet.

Figure 6:
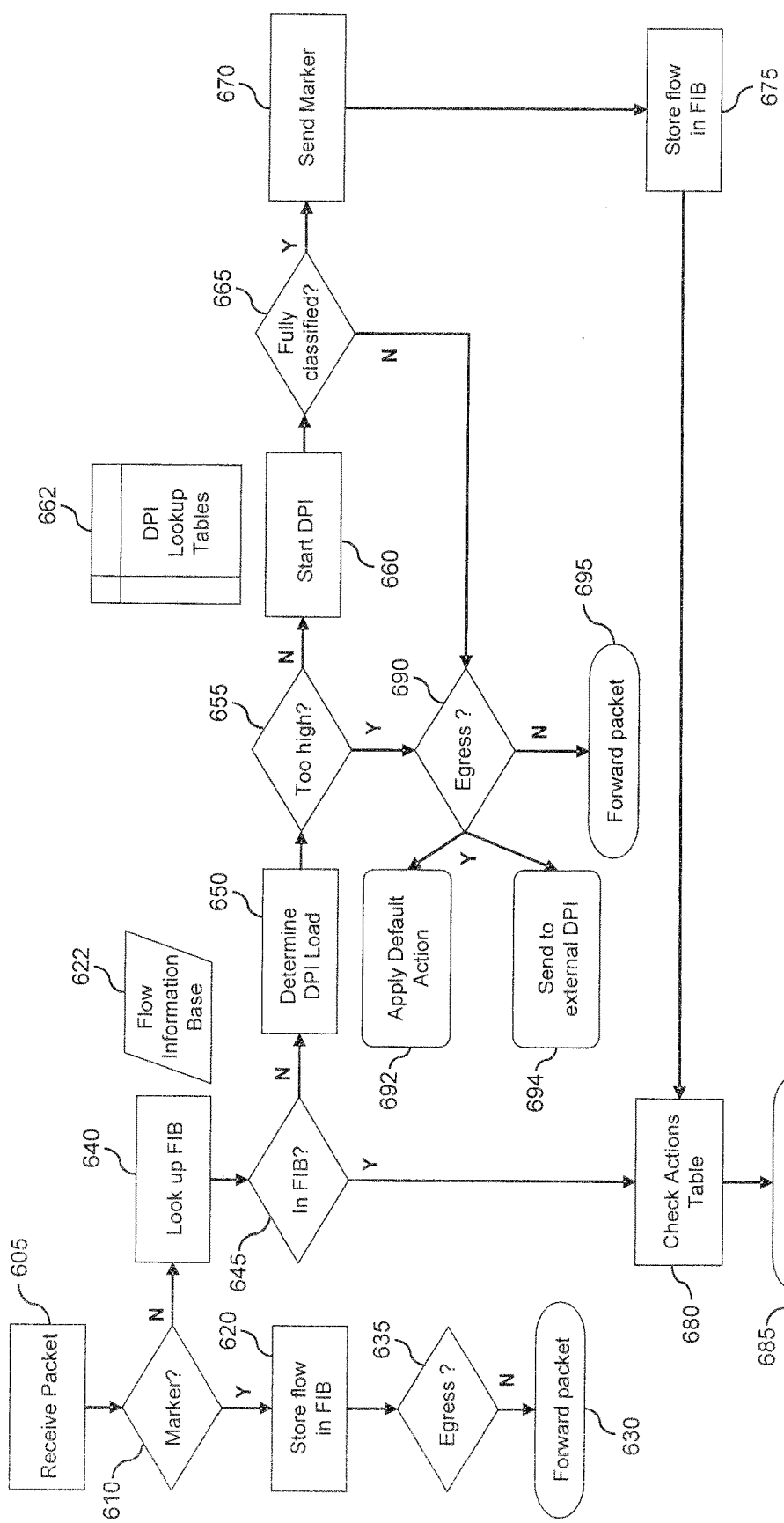
FIG. 6 shows a flowchart for illustrating a further method according to an embodiment of the invention.

As can be seen from the above explanations in connection with FIG. 6, a node may use a common implementation which allows it to act as the ingress node 210, the intermediate node 220, or the egress node 230. Further, it can be seen that classification dependent actions may also be applied nodes acting as the ingress node 210 or the intermediate node 220. This may allow for distributing the handling of such actions in the chain of nodes. Further, this may allow for performing an action earlier, which is generally beneficial. For example early discarding of data packets may allow for saving bandwidth and other network resources. Further, it also becomes possible to perform the same type of action at multiple nodes of the chain, thereby achieving an improved result from the actions. The latter may for example be useful if the action involves traffic shaping of the flow.

In some scenarios, also payload inspection of multiple data packets of a flow may be performed, thereby improving the chances of successful classification of the flow. In such cases, the ingress node 210 or intermediate node may for example generally refrain from attempting any multi-packet payload inspection and operate as explained above, leaving multi-packet payload inspection to the egress node 230.

Figure 3:
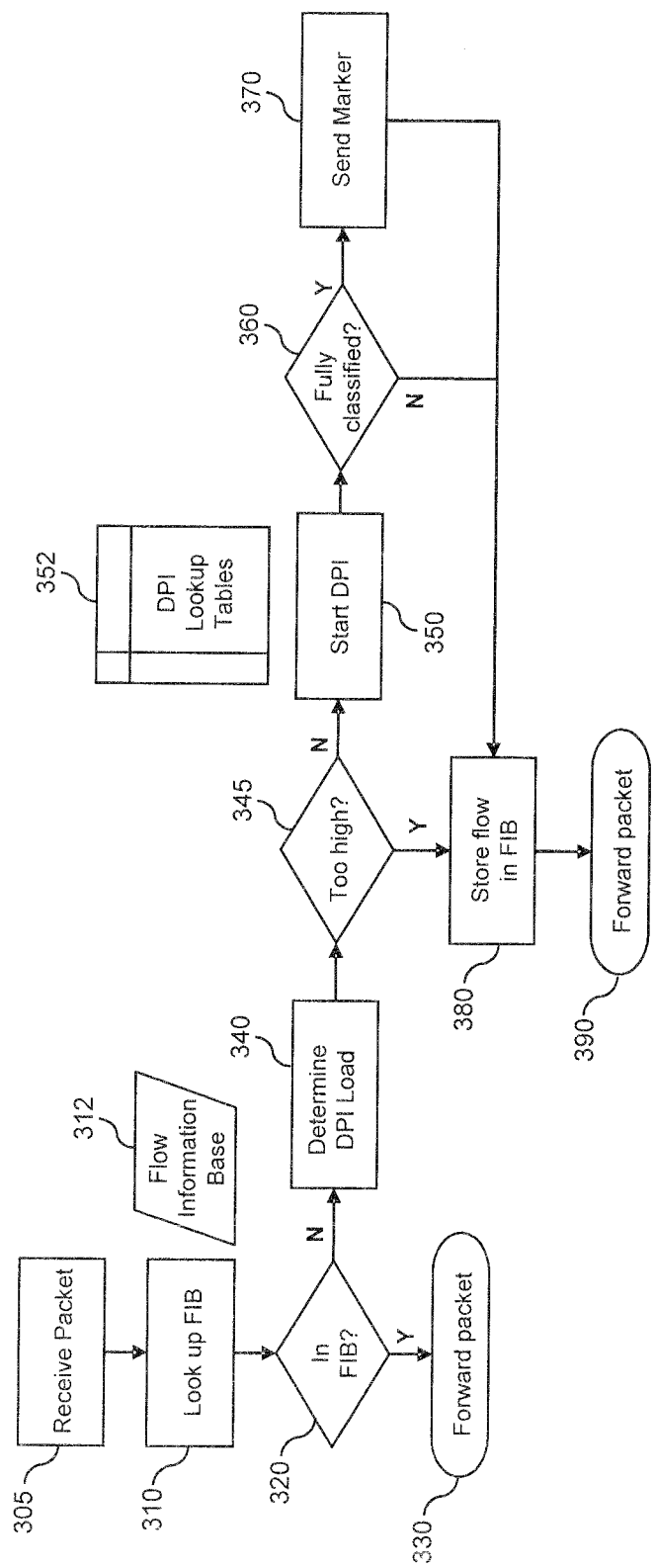
FIG. 3 shows a flowchart for illustrating a method according to an embodiment of the invention.
Figure 4:
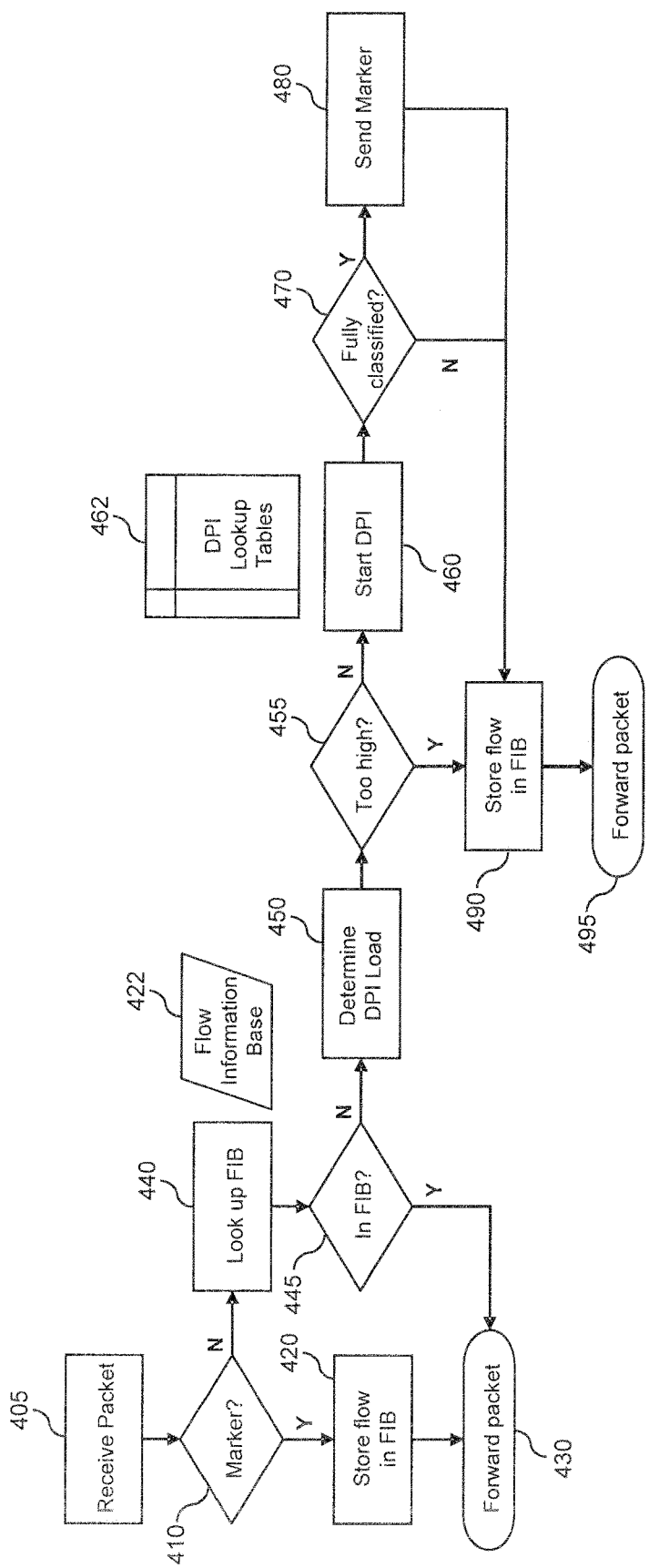
FIG. 4 shows a flowchart for illustrating a further method according to an embodiment of the invention.

Further, the ingress node 210 or the intermediate node 220 may, in response to determining that payload inspection of the data packet did not result in full classification, as for example checked at step 360 of FIG. 3 and step 470 of FIG. 4, further check if inspection of one or more subsequent data packets may allow for achieving a full classification. In this case, the node may store the achieved inspection result and take it into account when inspecting one or more subsequent data packets of the flow, and then forward the data packet.

In order to prevent downstream nodes from performing redundant payload inspection on the same flow, the node may further send an indication to the downstream node(s) to indicate that payload inspection at the node is in progress, e.g., by using a correspondingly tagged marker data packet. In this case, the marker data packet would merely indicate the node's decision to perform payload inspection of the flow, but not the result of payload inspection. The downstream node(s) may take this information into account when deciding whether to perform payload inspection of the flow.

When using the marker data packet to indicate that the payload inspection is in progress, also a further indication may be provided in the case that the payload inspection failed to achieve full classification of the flow. Again, a correspondingly tagged marker data packet may be used for the purpose of providing this indication. Upon receiving the indication of failure to achieve full classification of the flow, a downstream node may start performing payload inspection of the flow.

At the egress node 230, multi-packet payload inspection may be supported in the following manner. For example, in response to determining that payload inspection of the data packet did not result in full classification, the egress node 230 may further check if inspection of one or more subsequent data packets may allow for achieving a full classification. In this case, the egress node 230 may refrain from performing further classification of the flow, may store the flow in its FIB as to be classified by the external payload inspection node, and provide the data packet and subsequent data packets of the flow to the external payload inspection node, until the external traffic inspection node provides a classification result.

Further, the egress node 230 may store the achieved inspection result and take it into account when inspecting one or more subsequent data packets of the flow, i.e., perform multi-packet payload inspection.

Until achieving full classification of the flow, either by multi-packet payload inspection at the egress node 230 itself or by multi-packet payload inspection at the external payload inspection node, the egress node 230 may apply a default action to the data packets of the flow, e.g., forwarding, discarding, or buffering. This default action may be the same as applied for unclassified flows or may depend on a pre-classification of the flow.

Further, in some scenarios it may also be useful if a partial result of payload inspection is indicated to a downstream node, e.g., from the ingress node 210 to the intermediate node 220 and/or from the intermediate node 220 to the egress node 230. Such partial result may in particular be a pre-classification result. Also the indication of such partial result of payload inspection may be accomplished by transmitting a corresponding type of marker data packet. The downstream node receiving the partial result of payload inspection may utilize this information for continuing the classification process. In this way, the downstream node may finish classification started by the other node so that full classification can be achieved. The communication of partial results of payload inspection may in particular be beneficial in cases where one node does not have the processing capabilities to achieve full classification, but may perform classification up to a certain point. One specific example would be the classification of traffic types like "eDonkey" or "BitTorrent". In such cases, the classification process may include a first stage where traffic is pre-classified as "Peer-to-Peer", to be later followed by a second stage where the actual application type can be distinguished. In such cases, the second stage might require specific capabilities, like high amounts of memory, access to a database with IP addresses of known application nodes, or the like. The distributed payload inspection may then be performed in such a manner that the first stage is implemented at one node, e.g., at the ingress node 210 or intermediate node 220, and the second stage is implemented at a downstream node.

In some scenarios, also results of payload inspection of other flows may be taken into account in order to achieve classification of a flow. This may for example be useful where the classification rules rely on identifying a number of different flows from the same source and/or to the same destination which are correlated according to a given pattern, e.g., for identifying data traffic of certain peer-to-peer protocols. Such types of complex payload inspection may be taken into account by also considering information concerning other flows in the above processes. For example, when performing payload inspection for a given flow, the node may take into account a result of payload inspection on another flow as indicated by an upstream node.

As mentioned above, the indication of the decision to perform payload inspection of a flow and/or of the result of payload inspection may be accomplished over the same interface as also used for forwarding the data packets to the downstream node. In particular, a data packet related to the flow may be used for this purpose, e.g., in the form of a marker data packet.

The marker data packet may adopt some of the characteristics of the flow. This may help to ensure that the marker data packet is conveyed in the same manner through the chain of nodes participating in the distributed payload inspection as the data packets of the flow carrying user plane data traffic. Further, this may allow for utilizing the functionalities provided in the nodes for identifying packets as belonging to a flow also for identifying the marker data packet related to the flow.

For example, a flow may be identified by the IP 5-tuple <A, B, X, N, M>, where A denotes the source address, B denotes the destination address, X denotes the protocol type, N denotes the source port, and M denotes the destination port. The marker data packet could then be identified by the IP 5 tuple <A, B, MSV, N, M>, with the value "X" being part of the packet payload and MSV denoting a marker-specific value in place of the protocol type identifier. The marker data packet may then be easily identified as marker data packet by inspecting the IP 5-tuple. Further, after identifying the marker data packet, it may be easily related to the flow by evaluating the other parameters of the IP 5-tuple and the protocol type identifier "X" in the payload section of the marker data packet.

Alternatively, the marker data packet could be identified by the IP 5-tuple <A, B, MXSV, N, M>, with MXSV denoting a value in place of the protocol type identifier, which is specific for both the marker and the protocol type. Further, the marker data packet could be identified by the IP 5-tuple <A, B, X, MSV, M>, with the value "N" being part of the packet payload and MSV denoting a marker-specific value in place of the source port.

In the above examples, the marker-specific value may also indicate the classification result. For example, each traffic class may be assigned to a corresponding marker-specific value. Pre-classification results may be indicated in a similar manner, by defining coarser classes and corresponding marker-specific values. Alternatively, the classification result may also be indicated in a payload section of the marker data packet.

Accordingly, the marker data packet may include an identifier which at least in part corresponds to a flow identifier in the data packets of the flow subject to payload inspection.

In some scenarios, it may also occur that a marker data packet as used in the above implementations is lost, e.g., due to the use of a transport protocol which tolerates packet losses such as UDP. In the illustrated concepts, such loss of a marker data packets would have only minor impact because it would merely cause the downstream node to perform an otherwise unnecessary payload inspection process.

In some scenarios, the indication of the decision to perform payload inspection of a flow and/or of the result of payload inspection may also be provided with a protection against misuse. For example, this may be achieved by providing the marker data packet with a cryptographic signature. In this way, injection of faked marker data packets may be prevented. Such protection may for example be useful if a node in the chain is user controlled so that there is a possibility that the user installs modified software or firmware in the node which uses faked marker data packets to influence flow classification and thereby traffic handling. Protection against faked marker data packets may also be provided by configuring the ingress node 210 to discard marker data packets received from outside the chain of nodes participating in the distributed payload inspection.

In some scenarios, the indication of the decision to perform payload inspection of a flow and/or of the result of payload inspection may also be provided by providing data packets of the flow carrying user plane data traffic with an additional marking. In such cases, the operations of the ingress node 210 and intermediate node 220 could be modified in such a way that all data packets of an already classified flow are provided with the marking before being forwarded to the downstream node.

Such marking of individual data packets of a flow may for example be accomplished by modifying a certain information element in the data packets, e.g., the IPv6 flow label if this is not used otherwise. The latter solution avoids any additional transport overhead due to the marking. In other implementations, such marking of individual data packets could be accomplished by encapsulating or tunnelling the data packets, using additional headers. Still further, such marking of individual data packets could be accomplished by utilizing an existing tunnelling architecture implemented by the nodes of the chain. For example, if the nodes use Multiprotocol Label Switching (MPLS) for conveying the user plane data traffic, a plurality of tunnels one per class and destination could be used instead of a single tunnel per destination.

Figure 7:
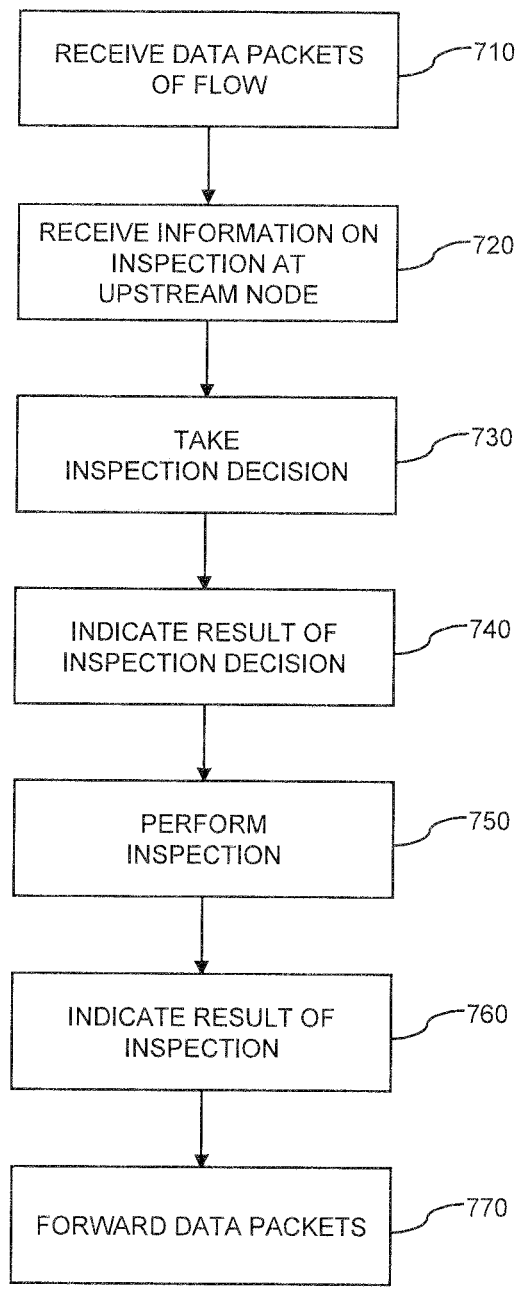
FIG. 7 shows a flowchart for illustrating a further method according to an embodiment of the invention.

FIG. 7 shows a flowchart for illustrating a method which may be used for implementing the above concepts of inspecting data traffic in a node corresponding to the ingress node 210 or intermediate node 220.

At step 710, the node receives data packets of a flow. If the node is an intermediate node in a chain of nodes participating in distributed payload inspection, the data packets may be received from an upstream node. If the node is an ingress node in a chain of nodes participating in distributed payload inspection, the data packets may be received from some other entity. The functionalities of the node are assumed to also involve forwarding the received data packets of the flow to a downstream node. This may also involve some further processing of the data packets, e.g., encapsulation or decapsulation. The downstream node may for example correspond to the intermediate node 220 or to the egress node 230.

In some implementations, the method may include step 720. At step 720, the node may receive information from an upstream node. For example, the node may receive the data packets of the flow from the upstream node, and the information may concern inspection of a payload section of at least one data packet of the flow at an upstream node. The received information may indicate a result of a decision by the upstream node whether to perform the inspection of the flow at the upstream node. Alternatively or in addition, the received information may also indicate a result of the inspection of the flow at the upstream node. In some implementation, the result of the decision may be indicated independently from the result of the inspection.

In addition or as an alternative, the node may also receive data packets of another flow from the upstream node, and the information may concern inspection of a payload section of at least one data packet of the other flow at the upstream node. In this case, the received information may indicate a result of a decision by the upstream node whether to perform the inspection of the other flow at the upstream node. Alternatively or in addition, the received information may also indicate a result of the inspection of the other flow at the upstream node. In some implementations, the result of the decision may be indicated independently from the result of the inspection.

The upstream node providing the information on the inspection of the flow and the upstream node providing the information on the inspection of the other flow may be the same or may be different. The information may for example be received in a data packet related to the flow or other flow, e.g., in a data packet of the flow or other flow, or in a marker data packet as explained above.

At step 730, the node takes a decision whether to perform inspection of a payload section of at least one data packet of the flow at the node. That is to say, the node selects between performing the inspection and not performing the inspection. This decision may be based on a capacity of the node for performing the inspection at the node. The capacity may for example be determined from a present overall load of the node, an expected load caused by the inspection, a configuration of the node, and/or capabilities of the node. In addition or as an alternative, the decision may also be based on the information optionally received at step 720. For example, if the received information indicates that the upstream node decided to perform the inspection of the flow, the node may decide not to perform the inspection of the flow. Similarly, if the information indicates that the upstream node decided not to perform the inspection of the flow, the node may decide to perform the inspection of the flow. Also, if the information indicates that the upstream node decided to perform the inspection of the other flow, the node may decide to perform the inspection of the flow.

At step 740, the node indicates a result of the decision of step 730 to the downstream node. This may for example be accomplished in a data packet related to the flow, e.g., in a data packet of the flow or in a marker data packet as explained above.

At step 750, in accordance with the decision of step 740, the node may perform at least a part of the inspection of the flow. The inspection may be implemented as DPI. The inspection may be performed taking into account the information optionally received at step 720. For example, if the received information indicates a pre-classification from a partially performed inspection at the upstream node, the node may use this pre-classification as a starting point for the inspection. Also, if the received information indicates a result of inspection for the other flow, the node may utilize this information in the inspection, e.g., by identifying correlation patterns between the flows.

At step 760, the node may indicate a result of the inspection of step 750 to the downstream node. Again, this may for example be accomplished in a data packet related to the flow, e.g., in a data packet of the flow or in a marker data packet as explained above.

At step 770, the node forwards the data packets to the downstream node. In addition to forwarding the data packets, the node may also apply some other action to subsequently received data packets of the flow, e.g., generate charging records, throttle transmission, perform traffic shaping, redirect data packets, or discard data packets.

It should be noted that the steps of FIG. 7 may be performed in a different order than illustrated in FIG. 7. For example, the indications of steps 740 and 760 could be performed together after performing the inspection of step 750. Also the forwarding of step 770 could be accomplished already after taking the decision of step 730.

Figure 8:
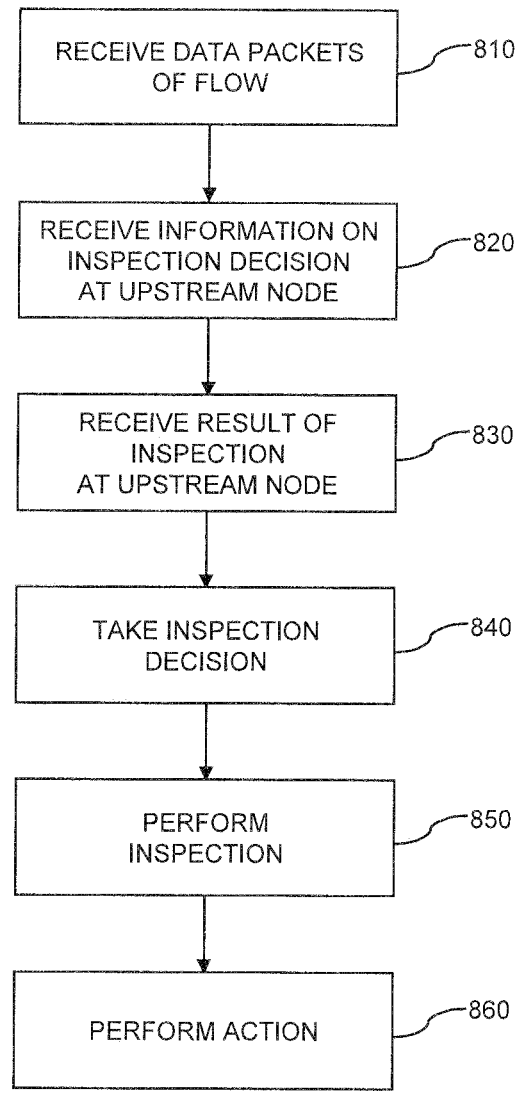
FIG. 8 shows a flowchart for illustrating a further method according to an embodiment of the invention.

FIG. 8 shows a flowchart for illustrating a method which may be used for implementing the above concepts of inspecting data traffic in a node corresponding to the egress node 230.

At step 810, the node receives data packets of a flow from an upstream node. The upstream node may for example correspond to the ingress node 210 or to the intermediate node 220.

At step 820 the node receives an indication from the upstream node. In particular, this indication concerns a result of a decision by the upstream node whether to perform inspection of a payload section of at least one data packet of the flow at the upstream node. The indication may for example be received in a data packet related to the flow, e.g., in a data packet of the flow or in a marker data packet as explained above.

In some implementations, the method may also include step 830. In step 830, the node the node may receive information on a result of the inspection at the upstream node. In some implementations, the node may also receive data packets of another flow from the upstream node, and step 830 may be used to receive information on inspection of a payload section of at least one data packet of the other flow at the upstream node. This information may indicate a result of a decision by the upstream node whether to perform the inspection of the other flow at the upstream node. Alternatively or in addition, the received information may also indicate a result of the inspection of the other flow at the upstream node. In some implementations, the result of the decision may be indicated independently from the result of the inspection.

In addition or as an alternative, the node may also receive data packets of another flow from another upstream node, e.g. corresponding to the ingress node 210, the intermediate node 220, or a further intermediate node, and step 830 may be used to receive information on inspection of a payload section of at least one data packet of the other flow at the other upstream node. This information may indicate a result of a decision by the other upstream node whether to perform the inspection of the other flow at the other upstream node. Alternatively or in addition, the received information may also indicate a result of the inspection of the other flow at the other upstream node. In some implementations, the result of the decision may be indicated independently from the result of the inspection.

The information of step 830 may for example be received in a data packet related to the flow or other flow, e.g., in a data packet of the flow or other flow, or in a marker data packet as explained above.

As can be seen from steps 820 and 830, the node may receive various information concerning the flow or other flows from one or more upstream node.

At step 840, the node takes a decision whether to perform inspection of a payload section of at least one data packet of the flow at the node. That is to say, the node selects between performing the inspection and not performing the inspection. This decision is taken on the basis of the indication received at step 820. For example, if the received information indicates that the upstream node decided to perform the inspection of the flow, the node may decide not to perform the inspection of the flow. Similarly, if the information indicates that the upstream node decided not to perform the inspection of the flow, the node may decide to perform the inspection of the flow. Further, this decision may also be based on the information received at step 830. For example, Also, if the information indicates that the upstream node decided to perform the inspection of the other flow, the node may decide to perform the inspection of the flow. Further, the decision may also be based on a capacity of the node for performing the inspection at the node. The capacity may for example be determined from a present overall load of the node, an expected load caused by the inspection, a configuration of the node, and/or capabilities of the node.

At step 850, in accordance with the decision of step 840, the node may perform at least a part of the inspection of the flow. The inspection may be implemented as DPI. The inspection may be performed taking into account the information optionally received at step 830. For example, if the received information indicates a pre-classification from a partially performed inspection of the flow at the upstream node, the node may use this pre-classification as a starting point for the inspection. Also, if the received information indicates a result of inspection for the other flow, the node may utilize this information in the inspection, e.g., by identifying correlation patterns between the flows.

At step 860, the node may perform an action on the inspected data packet(s) and/or on subsequently received data packets of the flow. This action may depend on results of the inspection performed at step 850 and/or on one or more inspection results optionally received at step 830. For example, depending on the inspection results, the node may generate charging records, throttle transmission, perform traffic shaping, redirect data packets, or discard data packets.

It should be noted that the steps of FIG. 8 may be performed in a different order than illustrated in FIG. 8. For example, the information of steps 820 and 830 could be received in a single step. Further, in some cases the action of step 860 may in some cases also be applied immediately after receiving the information of step 830.

It is to be understood that the methods of FIGS. 7 and 8 may be combined in a system of at least two nodes. In such cases, the node of the method of FIG. 7 may correspond to the upstream node in the method of FIG. 8, and the node in the method of FIG. 8 may correspond to the downstream node in the method of FIG. 7.

Figure 9:
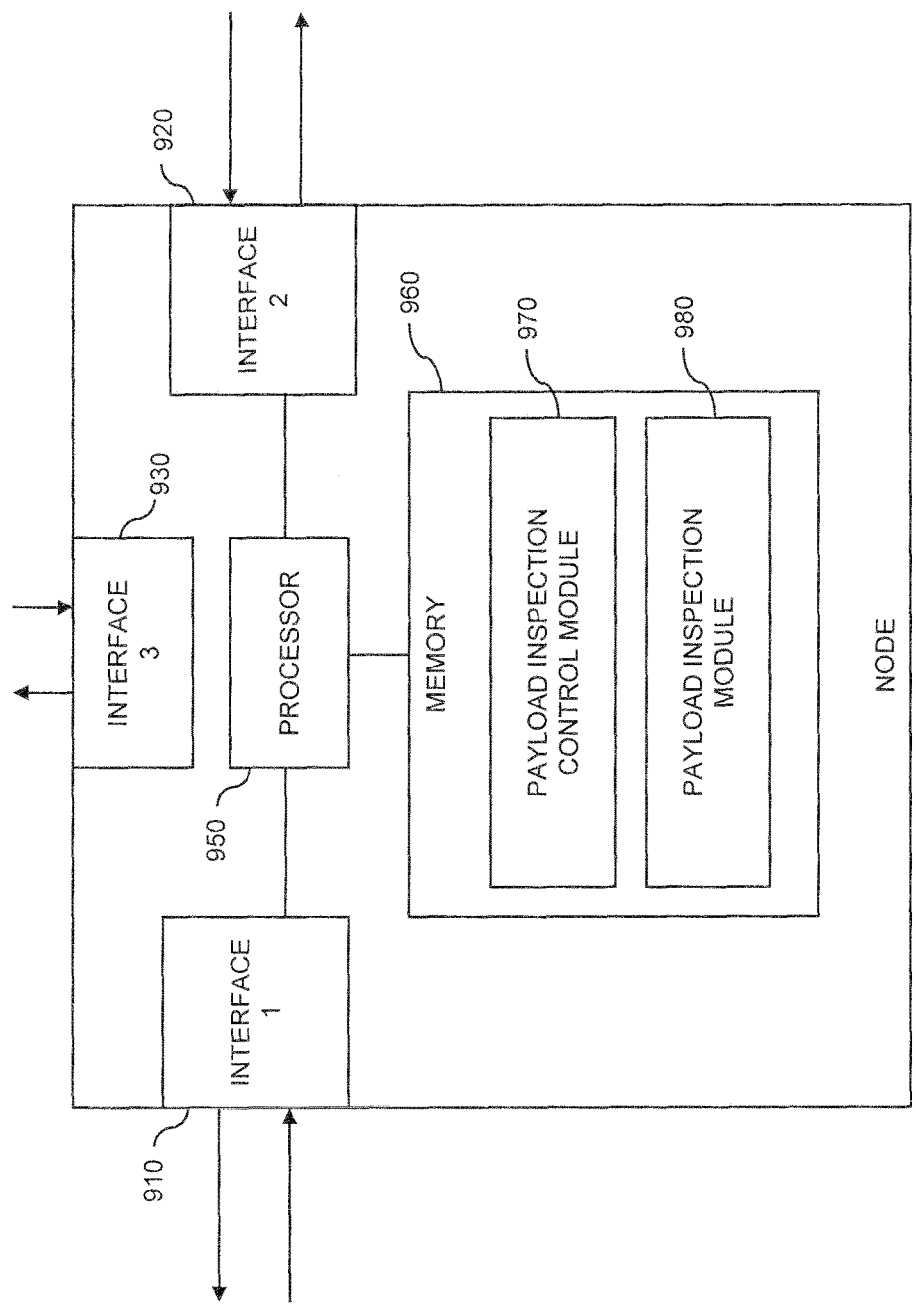
FIG. 9 schematically illustrates a node according to an embodiment of the invention.

FIG. 9 illustrates exemplary structures of a node which may be used for implementing the above concepts.

As illustrated, the node may include a first interface 910 and a second interface 920. In some implementations, also a third interface 930 may be provided. The first and the second interfaces 910, 920 may have the purpose of receiving user plane data traffic in the node and/or forwarding the user plane data traffic from the node. The third interface 930 may for example have the purpose of providing a connection to a node which is not arranged in the path of the user plane traffic, e.g., the traffic inspection node 50 of FIG. 1 or some control node. In some implementations, also multiple interfaces for receiving the user plane data traffic in the node and/or multiple interfaces for forwarding the user plane data traffic from the node may be provided, e.g., for supporting parallel connections to neighboring nodes and/or for supporting more complex arrangements of nodes than the single chain as illustrated in FIG. 2.

Further, the node includes a processor 950 coupled to the interfaces 910, 920 and a memory 960 coupled to the processor 950. The memory 960 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 960 includes suitably configured program code to be executed by the processor 950 so as to implement the above-described functionalities of a node participating in the distributed payload inspection, as the ingress node 210, as the intermediate node 220, and/or as the egress node 230. More specifically, the memory 960 may include an payload inspection control module 970 so as to implement the above-described functionalities of performing decisions with respect to payload inspection and communicating the results of such decisions and optionally also the results of payload inspection, e.g., via the first interface 910 or second interface 920. Further, the memory 960 may also include a payload inspection module 980 for implementing the payload inspection process at the node.

It is to be understood that the structure as illustrated in FIG. 9 is merely schematic and that the node may actually include further components which, for the sake of clarity, have not been illustrated, e.g., further interfaces. Also, it is to be understood that the memory 960 may include further types of program code modules, which have not been illustrated, e.g., program code modules for implementing known functionalities of a node conveying user plane traffic, e.g., as typically implemented by an access node, transport node, or gateway node. Further, the memory 960 may also include further data to be used for the illustrated payload inspection functionalities, e.g., lookup tables or rule sets for classifying traffic. According to some embodiments, also a computer program product may be provided for implementing functionalities of the node, e.g., in the form of a medium storing the program code and/or other data to be stored in the memory 960.

As can be seen, the concepts as described above may be used for distributing payload inspection of user plane traffic in an efficient manner between multiple chained nodes. Specifically, available processing resources at nodes conveying user plane traffic, e.g., access nodes, transport nodes, or gateway nodes, may be utilized in an efficient manner. The usage of dedicated payload inspection devices may thus be limited by providing payload inspection functionalities in such nodes. Further, also nodes with only limited available capacity for performing payload inspection may still contribute to the overall payload inspection process, e.g., by performing payload inspection for only a subset of flows and/or by providing only partial inspection results. Further, by integrating the payload inspection functionalities in the nodes, the network structure can be kept simple and usage of additional transport nodes can be avoided. By allowing configurations in which different nodes of the chain perform payload inspection with respect to different subsets of traffic classes, the capabilities of individual nodes can be further adapted to the specific subset of traffic classes. For example, tailored lookup tables for the payload inspection could be used at the individual nodes, thereby further improving classification efficiency as compared to scenarios in which each chained node provides substantially the same capabilities.

Although the above description mainly refers to nodes designed for conveying user plane data traffic and further equipped with embedded payload inspection functionalities, it should be understood that usage of other types of nodes is not excluded. Further, it should be understood that, in addition to the described actions and forwarding, the nodes may perform other types of processing on the data packets, in accordance with conventional functionalities of the node. For example, the gateway node 40 could receive the uplink user plane traffic in an encapsulated manner, e.g., according to the GPRS Tunnelling Protocol, and decapsulate the uplink user plane data traffic before forwarding it to the external network. In the downlink direction, the gateway node 40 may in turn perform encapsulation of the user plane data traffic.

Further, it is to be understood that in scenarios where the nodes use tunnelling and/or encapsulation for conveying the user plane data traffic, payload inspection may be performed on the encapsulated data packets or the data packets may be decapsulated before performing payload inspection. In some cases, such encapsulation may provide information which can be utilized in the above methods, e.g., for determining whether a node acts an egress node or for identifying that data packets belong to a certain flow. Also, it should be understood that in case of encapsulated data packets the payload inspection typically is performed on the payload section of the innermost encapsulated data packet.

It is to be understood that the examples and embodiments as explained above are merely illustrative and susceptible to various modifications. For example, the concepts as described herein could be used in various types of telecommunications networks, e.g., combining different types of access technology, including non-cellular broadband access technology and fixed broadband access technology such as Digital Subscriber Line, Optical, or Coaxial Cable. Moreover, it is to be understood that the above concepts may be implemented by using correspondingly designed software to be executed by a processor of an existing device, or by using dedicated device hardware. Still further, it is to be understood that the above-mentioned nodes may each be implemented by a single device or by multiple devices, e.g., by a device cloud or the like.

The invention claimed is:

1. A method of inspecting data traffic in a telecommunications network, the method comprising:
    a node of the telecommunications network receiving first data packets of a first flow and second data packets of a second flow;
    the node determining if a data packet of the first flow belongs to a known, already classified flow by determining if a table of classifications maintained at the node has a classification of the first flow based on a result of an inspection of at least one data packet of the first flow;
    responsive to determining the data packet of the first flow belongs to the known, already classified flow, the node forwarding the data packet of the first flow to a downstream node of the telecommunications network without inspection of a payload section of the data packet of the first flow;
    responsive to determining a data packet of the second flow belongs to an unclassified flow by determining, based on a header section of the data packet of the second flow, that the table of classifications does not have a classification of the second flow and that the data packet of the second flow is from a subset of flow classes for which the node is capable of performing inspection of the payload sections of data packets from the subset of flow classes, the node deciding to perform inspection of the payload section of the data packet of the second flow at the node based on a capacity of the node to perform the inspection of the payload section at the node;
    the node indicating a result of deciding to perform the inspection to the downstream node;
    performing inspection of the payload section of the data packet of the second flow at the node responsive to the decision to perform inspection of the payload section of the data packet of the second flow;
    the node updating the table of classifications maintained at the node to indicate a classification of the second flow based on the result of said inspection of the data packet of the second flow; and
    on the basis of a result of said inspection of the payload section of the data packet of the second flow at the node, the node updating an action table to indicate an action to be performed on subsequently received data packets of the second flow;
    the node, responsive to being an egress node with respect to the second flow, performing the action on the subsequently received data packets of the second flow; and
    the node, responsive to being an ingress node with respect to the second flow or an intermediate node with respect to the second flow, forwarding the subsequently received data packets of the second flow towards the egress node without inspection of a payload section of the subsequently received data packets of the second flow.

2. The method according to claim 1, comprising:
    the node receiving the data packets of the second flow from an upstream node of the telecommunications network; and
    the node receiving information on inspection of a payload section of at least one data packet of the second flow at the upstream node;
    wherein said decision to perform the inspection of the payload section is based on the received information.

3. The method according to claim 2,
    wherein the received information indicates a result of a decision by the upstream node whether to perform said inspection of the second flow at the upstream node.

4. The method according to claim 2,
    wherein the received information comprises a result of said inspection of the second flow at the upstream node.

5. The method according to claim 4, comprising:
    on the basis of the result of the received information, the node performing an action on subsequently received data packets of the second flow.

6. The method according to claim 2, comprising:
    on the basis of the received information, the node performing said inspection of the second flow at the node.

7. The method according to claim 1, comprising:
    the node receiving the data packets of a third flow from an upstream node of the telecommunications network; and
    the node receiving information on further inspection of a payload section of at least one data packet of the third flow at the upstream node,
    deciding to perform an inspection of the payload section of the at least one data packet of the third flow based on the received information.

8. The method of claim 1 further comprising:
    the node receiving third data packets of a third flow;
    the node determining the third data packets of the third flow belong to an unclassified flow that is from a subset of flow classes in which the node is capable of performing inspection of the payload sections of data packets from the subset of flow classes;
    the node performing inspection of a payload section of a data packet of the third flow at the node responsive to a decision to perform inspection of the payload section of the data packet of the third flow; and
    responsive to the node in performing inspection of the payload section of the data packet of the third flow at the node responsive to a decision to perform inspection of the payload section of the data packet of the third flow does not fully classify the data packet within a defined time span, the node forwarding the data packet of the third flow to the downstream node without updating the action table and the table of classifications.

9. The method according to claim 1 wherein the action to be performed on subsequently received data packets is one of generation of a charging record for subsequent data packets of the flow, throttling transmission of subsequent data packets of the flow, and redirection of subsequent data packets of the flow.

10. A method of inspecting data traffic in a telecommunications network, the method comprising:
a node of the telecommunications network receiving data packets of a flow from an upstream node of the telecommunications network;
the node receiving an indication of a result of a decision by the upstream node not to perform inspection of a payload section of at least one data packet of the flow at the upstream node;
on the basis of the indicated result of the decision by the upstream node not to perform inspection of the payload section of the at least one data packet of the flow at the upstream node, the node taking a decision whether to perform inspection of the payload section of the at least one data packet of the flow at the node based on a capacity of the node to perform the inspection of the payload section at the node;
responsive to deciding to perform an inspection of the payload section of the at least one data packet of the flow:
performing inspection of the payload section of the data packet of the at least one data packet of the flow;
on the basis of a result of said inspection of the payload section of the at least one data packet of the flow at the node:
the node updating a table of classifications maintained at the node to indicate a classification result of the flow based on the result of said inspection of the data packet of the flow;
the node updating an action table to indicate an action to be performed on subsequently received data packets of the flow;
the node forwarding the at least one data packet of the flow to a downstream node of the flow based on an action associated with the classification result indicating that the at least one data packet of the flow is to be forwarded; and
the node performing the action on subsequently received data packets of the flow;
responsive to deciding not to perform an inspection of the payload section of the at least one data packet of the flow:
the node sending the at least one data packet of the flow to a traffic inspection node external to the flow;
the node receiving a classification result from the traffic inspection node for the at least one data packet of the flow;
responsive to receiving the classification result:
the node updating the table of classifications to indicate the classification result;
the node updating the action table to indicate an action to be performed on subsequently received data packets of the flow; and
the node forwarding the at least one data packet of the flow to the downstream node of the flow based on an action associated with the classification result indicating that the at least one data packet of the flow is to be forwarded; and
forwarding other data packets of the flow to the downstream node of the flow based on the action associated with the classification result without sending the other data packets to the traffic inspection node.

11. The method according to claim 10, comprising:
the node receiving data packets of a third flow from the upstream node; and
the node receiving information on further inspection of a payload section of at least one data packet of the third flow at the upstream node,
deciding to perform an inspection of the payload section of the at least one data packet of the third flow based on the received information.

12. The method according to claim 11, wherein the received information indicates a result of a further decision by the upstream node whether to perform said further inspection of the third flow at the upstream node.

13. The method according to claim 11, wherein the received information comprises a result of said further inspection of the third flow at the upstream node.

14. The method according to claim 10, comprising:
the node receiving data packets of another flow from another upstream node of the telecommunications network; and
the node receiving information on inspection of a payload section of at least one data packet of the other flow at the other upstream node,
wherein said decision taken by the node is based on the received information.

15. The method according to claim 14, wherein the received information indicates a result of a decision by the other upstream node whether to perform said inspection of the other flow at the other upstream node.

16. The method according to claim 14, wherein the received information comprises a result of the inspection of the other flow at the other upstream node.

17. The method according to claim 10, comprising:
on the basis of the received information, the node performing the inspection of the payload section of the at least one data packet of the flow at the node.

18. The method according to claim 10, comprising:
on the basis of the received information, the node performing an action on subsequently received data packets of the flow.

19. The method according to claim 10, comprising:
the node performing the inspection of the payload section of the at least one data packet of the flow at the node; and
on the basis of a result of said inspection at the node, the node performing an action on subsequently received data packets of the flow.

20. The method of claim 10 further comprising:
responsive to receiving the classification result from the traffic inspection node, the node discarding the at least one data packet of the flow based on the action associated with the classification result indicating that the at least one data packet of the flow is to be discarded; and
the node discarding other data packets of the flow based on the action associated with the classification result.

21. A node for a telecommunications network, the node comprising:
at least one first interface configured to receive first data packets of a first flow and second data packets of a second flow;

at least one second interface configured to forward the received first and second data packets of the first and second flows to a downstream node of the telecommunications network; and a processor configured to:
determine if a data packet of the first flow belongs to a known, already classified flow by determining if a table of classifications maintained at the node has a result of a classification of the first flow;
responsive to determining the data packet of the first flow belongs to the known, already classified flow, the node forwarding the data packet to the downstream node without inspection of a payload section of the data packet;
responsive to determining a data packet of the second flow belongs to an unclassified flow that is from a subset of flow classes in which the node is capable of performing inspection of the payload sections of data packets from the subset of flow classes, take a decision whether to perform inspection of the payload section of the data packet of the second flow at the node, wherein the decision taken by the node is based on a capacity of the node to perform the inspection of the payload section at the node;
indicate a result of the decision to the downstream node;
perform inspection of the payload section of the data packet of the second flow at the node responsive to a decision to perform inspection of the payload section of the data packet of the second flow;
update the table of classifications to indicate a classification result of the flow based on the result of said inspection of the data packet of the flow;
update an action table to indicate an action to be performed on subsequently received data packets of the second flow; and
on the basis of a result of said inspection of the payload section of the data packet of the second flow at the node:
responsive to the node being an egress node with respect to the second flow, perform the action on subsequently received data packets of the second flow; and
responsive to the node being an ingress node with respect to the second flow or an intermediate node with respect to the second flow, forwarding subsequently received data packets of the second flow towards the egress node without inspection of a payload section of the subsequently received data packets of the second flow.

22. The node according to claim 21,
wherein to perform the inspection of the payload section of the data packet, the processor is configured to perform at least a part of the inspection; and
wherein the processor is configured to indicate a result of the inspection of the second flow at the node to the downstream node.

23. A node for a telecommunications network, the node comprising:
at least one interface configured to receive data packets of a flow from an upstream node of the telecommunications network; and
a processor configured to:
receive an indication of a result of a decision by the upstream node not to perform inspection of a payload section of at least one data packet of the flow at the upstream node of the telecommunications network;
on the basis of the indicated result of the decision by the upstream node not to perform inspection of the payload section of the at least one data packet of the flow at the upstream node, take a decision whether to perform inspection of a payload section of at least one data packet of the flow at the node, wherein the decision taken by the node is based on a capacity of the node to perform the inspection of the payload section at the node;
responsive to deciding to perform an inspection of the payload section of the at least one data packet of the flow:
perform inspection of the payload section of the data packet of the at least one data packet of the flow;
on the basis of a result of said inspection of the payload section of the at least one data packet of the flow at the node:
update a table of classifications maintained at the node to indicate a classification result of the flow based on the result of said inspection of the at least one data packet of the flow;
update an action table to indicate an action to be performed on subsequently received data packets of the flow;
perform the action on subsequently received data packets of the flow;
responsive to deciding not to perform an inspection of the payload section of the at least one data packet of the flow:
send the at least one data packet of the flow to a traffic inspection node external to the flow;
receive a classification result from the traffic inspection node for the at least one data packet of the flow;
responsive to receiving the classification result from the traffic inspection node:
update the table of classifications to indicate a classification result of the flow based on the result of said inspection of the at least one data packet of the flow;
update the action table to indicate an action to be performed on subsequently received data packets of the flow;
forward the at least one data packet of the flow to a downstream node of the flow based on an action associated with the classification result indicating that the at least one data packet of the flow is to be forwarded; and
forward other data packets of the flow to the downstream node of the flow based on the action associated with the classification result without sending the other data packets to the traffic inspection node.

24. The node of claim 23 wherein the processor is further configured to:
responsive to receiving the classification result from the traffic inspection node, discard the at least one data packet of the flow based on an action associated with the classification result that indicates the at least one data packet of the flow is to be discarded; and
discard other data packets of the flow based on the action associated with the classification result.

* * * * *